Nov. 28, 1939.    C. A. CAMPBELL    2,181,223
AIR BRAKE
Filed Nov. 17, 1937    6 Sheets-Sheet 1

Inventor
Charles A. Campbell
By
Attorneys

Nov. 28, 1939.  C. A. CAMPBELL  2,181,223
AIR BRAKE
Filed Nov. 17, 1937  6 Sheets-Sheet 2
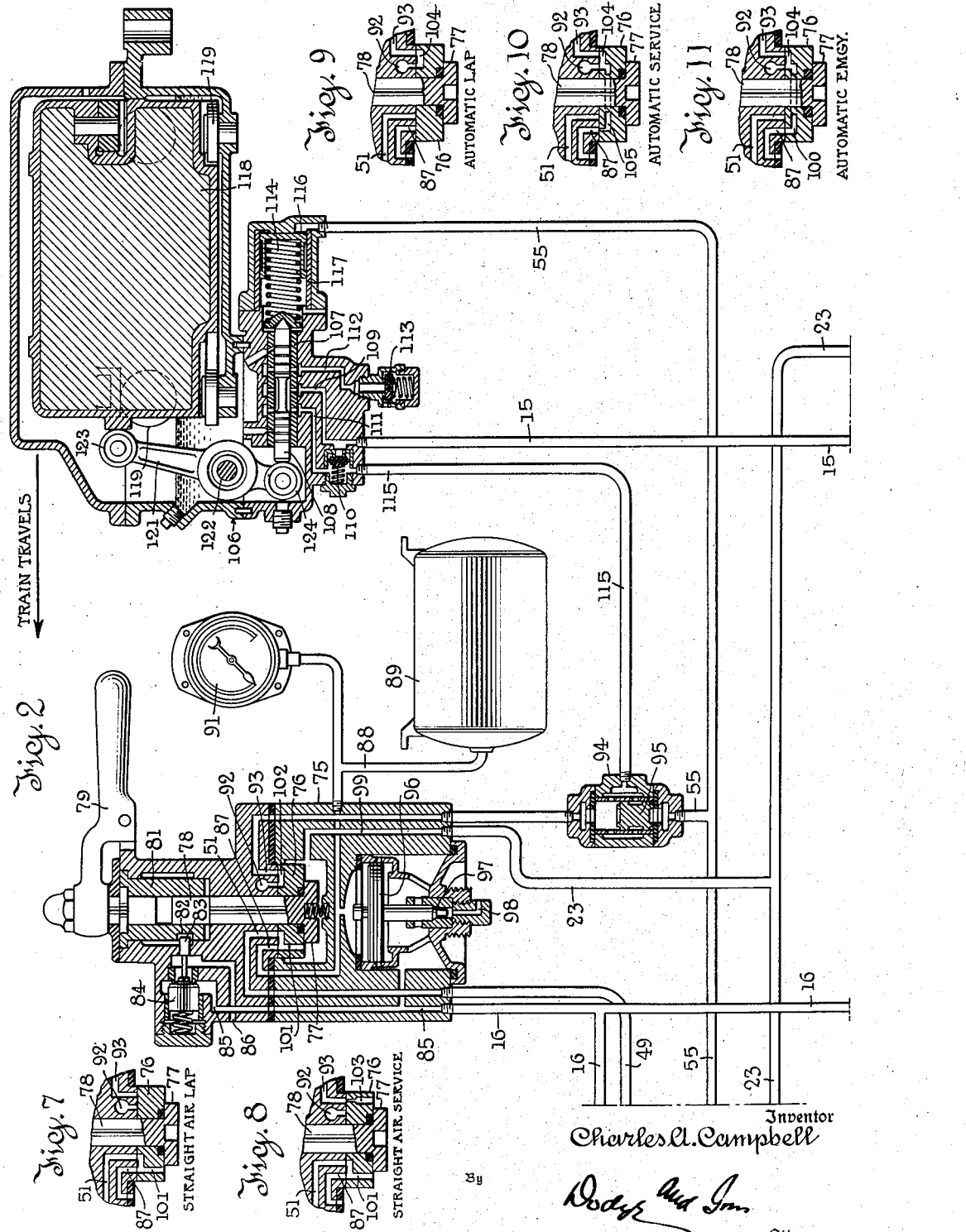

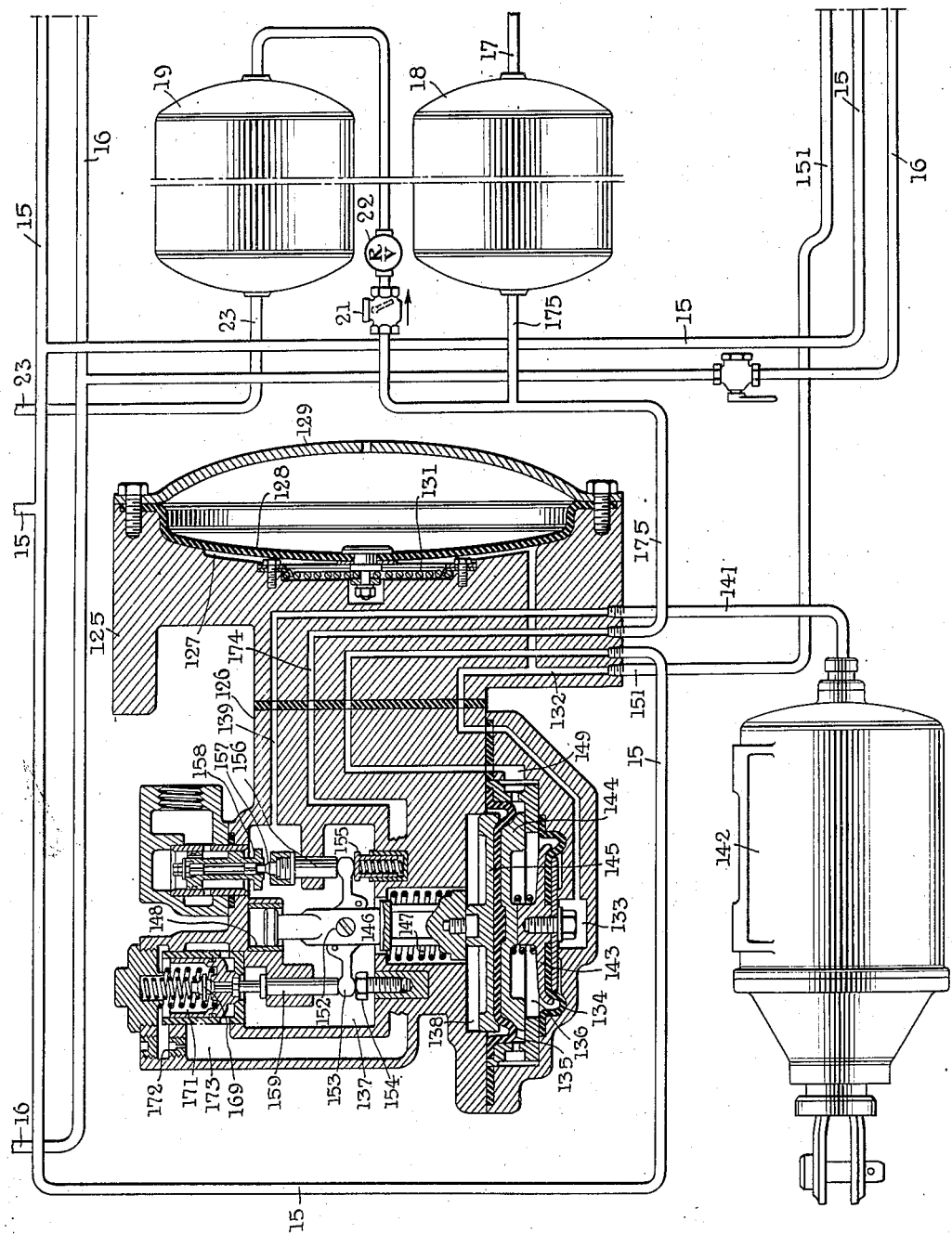

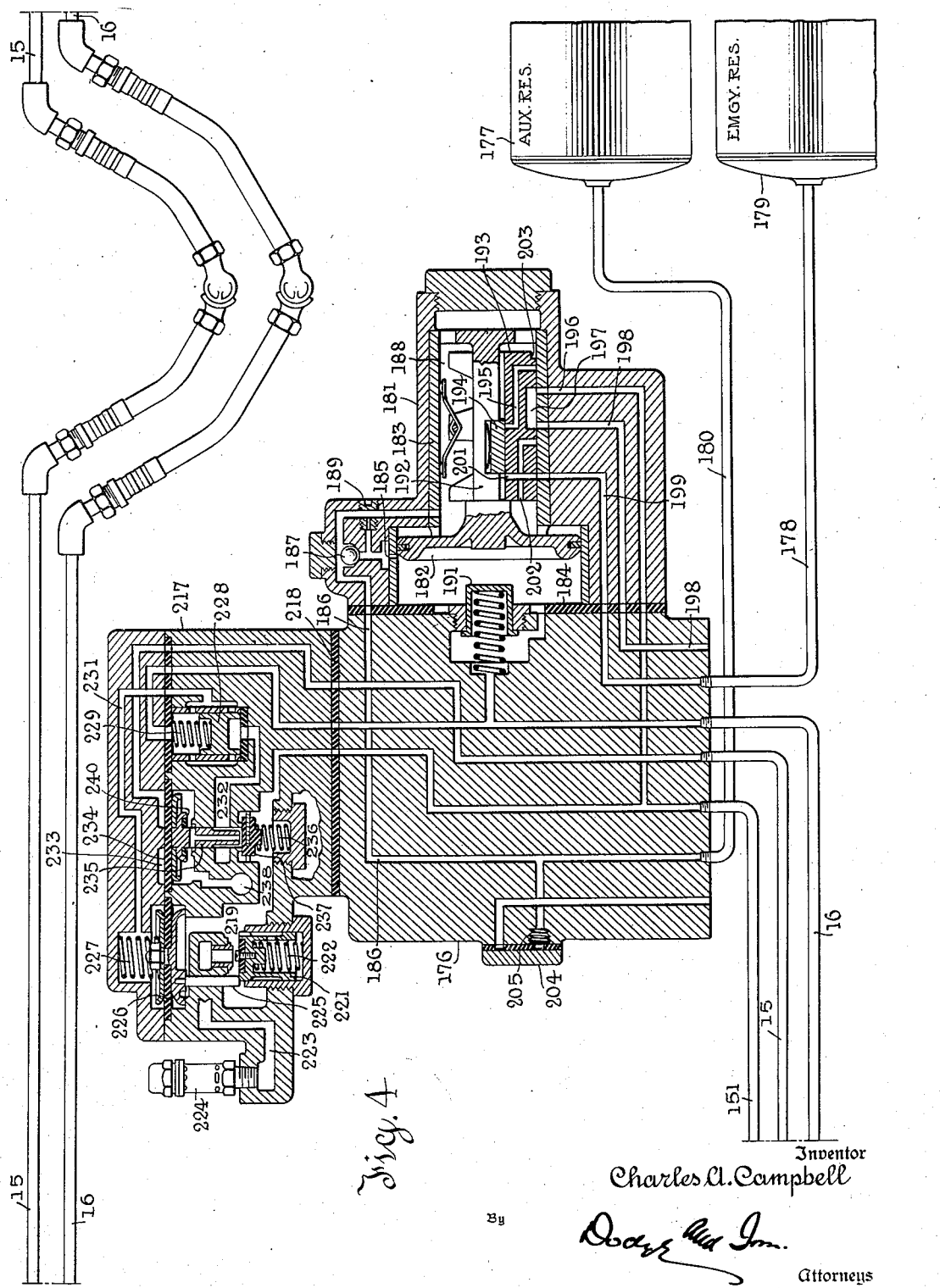

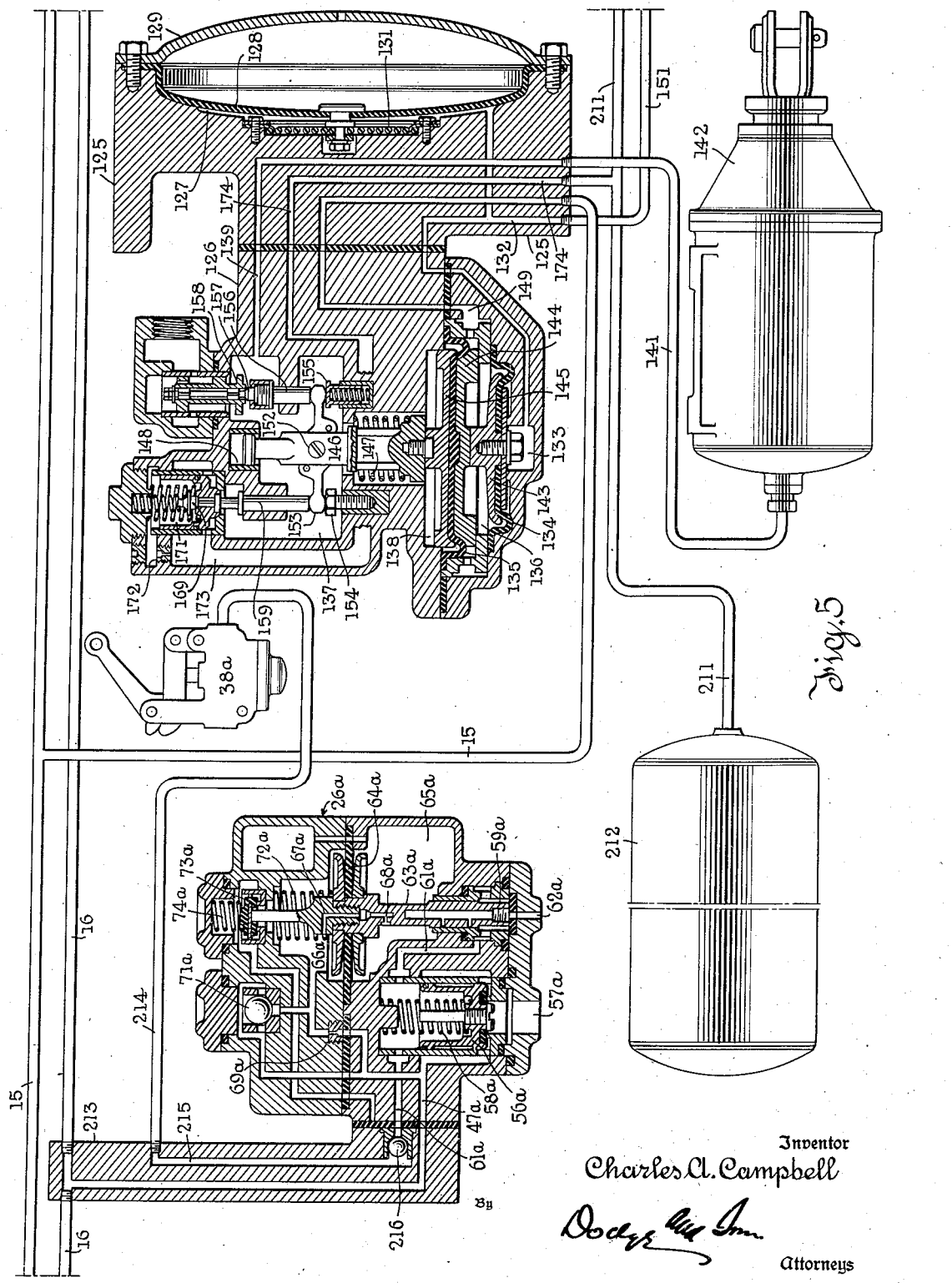

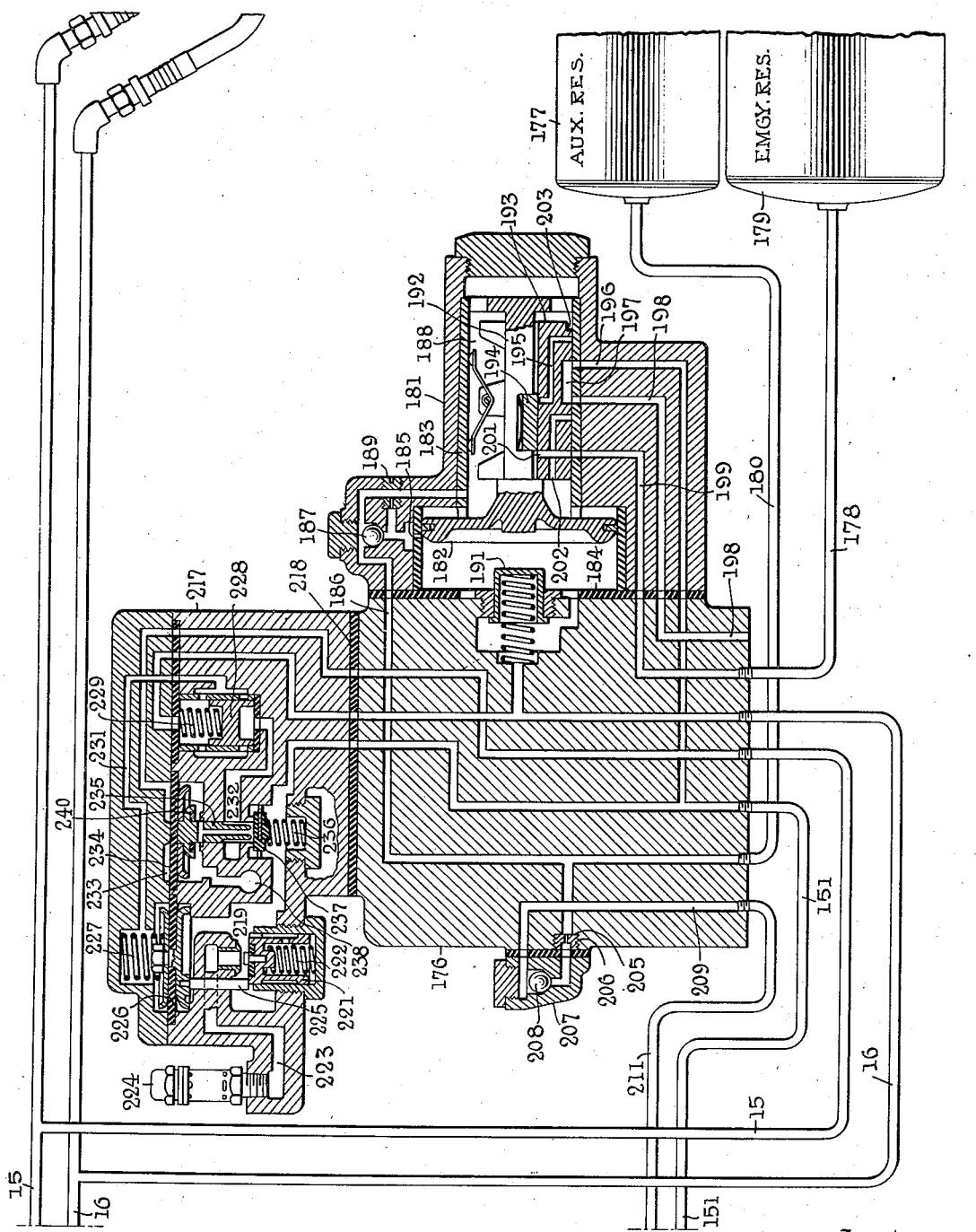

Patented Nov. 28, 1939

2,181,223

UNITED STATES PATENT OFFICE 2,181,223

AIR BRAKE

Charles A. Campbell, Watertown, N. Y., assignor to The New York Air Brake Company, a corporation of New Jersey Application November 17, 1937, Serial No. 175,152

34 Claims. (Cl. 303—24)

This invention relates to air brakes and particularly to devices known as control valves capable of general use but actually used chiefly in high speed brake systems such as "Schedule H. S. C." and "Schedule A. H. S. C."

High speed brake systems now in commercial use on American railroads are of what might be called a bi-lateral type, that is to say, they involve as a merged or combined structure, two operatively complete systems, one straight air and the other automatic. The two systems, while each is operable independently to perform a braking function, are not mechanically distinct, for certain components (notably the local relays) function in a brake application, whether straight air or automatic. Certain other components such for example as the deceleration controller function in all straight air applications (because the deceleration control is on the straight air side of the system) but may or may not function effectively in an automatic application. For example, an application initiated automatically, may or may not shift to the straight air side, depending on conditions at the time.

To elaborate, in the A. H. S. C. system, the engineer's brake valve has two distinct settings, in one of which it operates the brakes on the combined straight air and automatic basis with deceleration control, and in the other of which the system operates on a strictly automatic basis without deceleration control.

Furthermore, car equipments for both A. H. S. C. and H. S. C. systems are identical and a train of such cars may be drawn and its brakes controlled by a locomotive equipped with an ordinary automatic brake system. Or a high speed train equipped with either system may be double-headed, using a steam locomotive having automatic brakes as the leading and brake controlling unit. In the conditions mentioned in the present paragraph, the systems operate on the automatic basis without deceleration control.

The utility of deceleration control depends on the possibility of using unusually high initial braking ratios with ensuing progressive release, under speed or deceleration control at such rates as will maintain substantially constant deceleration, and at the same time prevent the inherently rising brake shoe friction from causing locking and sliding of the wheels.

It follows that a system having deceleration control is inherently over-powered unless the brake application be modulated by some means such as speed or deceleration control. Consequently when the system is operated as an automatic system, and such modulation is not provided, or is accidentally rendered ineffective, some action must be taken to limit brake applications. The first recourse involved the limitation of main reservoir pressure, but this required manual setting and was frequently neglected with seriously harmful results.

The present invention adds a component to each braking unit (control valve), so contrived that the modulated control (deceleration or speed) may take charge normally whenever conditions permit. At all other times, braking is limited to safe values. The result is secured by controlling braking ratios, partly by the use of a double ratio local relay, and partly by the use of a pressure relief valve which is cut into and out of action automatically in response to conditions in the system.

The H. S. C. and A. H. S. C. systems each involve the use of magnet valves to accelerate the action of the control valves, and a master relay and circuit breaker. The A. H. S. C. system further includes a complicated convertible engineer's brake valve. The devices forming the subject-matter of the present application operate in the same way regardless of the presence or absence of the devices just enumerated.

For disclosure purposes, a system omitting the magnet valves, and master relay and circuit breaker, will be described with control by a very simple combined straight air and automatic brake valve. Furthermore, the triple valve component of the control valve will be shown as of a very simple type, omitting such non-essential features, as quick service, release-ensuring valve, feed back and graduated release. The invention is indifferent to the presence or absence of these features. Their omission is solely in the interest of simplicity of description. The possibility of using them and other known refinements in systems with which the present invention is used, is expressly recognized.

The invention in the above mentioned simplified environment, will now be described by reference to the accompanying drawings in which the six figures show a system for motor car and one trailer in diagrammatic section with piping connection when assembled as folows: Figure 2 above Figure 3, Figure 1 to the left of Figure 2, and Figures 4, 5, and 6 to the right of Figure 3 in the order stated.

Figure 2 shows the engineer's brake valve in running and release position and the deceleration controller (both on motor unit).

Figure 3 shows the double diaphragm relay and compensating chamber, also the brake cylinder and main reservoirs (on motor unit).

Figure 4 shows the valve bracket with associated triple valve and relief valve, with associated auxiliary and emergency reservoirs (on motor unit).

Figure 5 shows a part of the unit in the first trailer car, namely vent valve with conductor's valve, double diaphragm relay with compensating chamber, brake cylinder and local reservoir.

Figure 6 shows the remainder of the unit on the first trailer car, namely the valve bracket with associated triple valve and relief valve, with associated auxiliary and emergency reservoirs.

Figure 1:
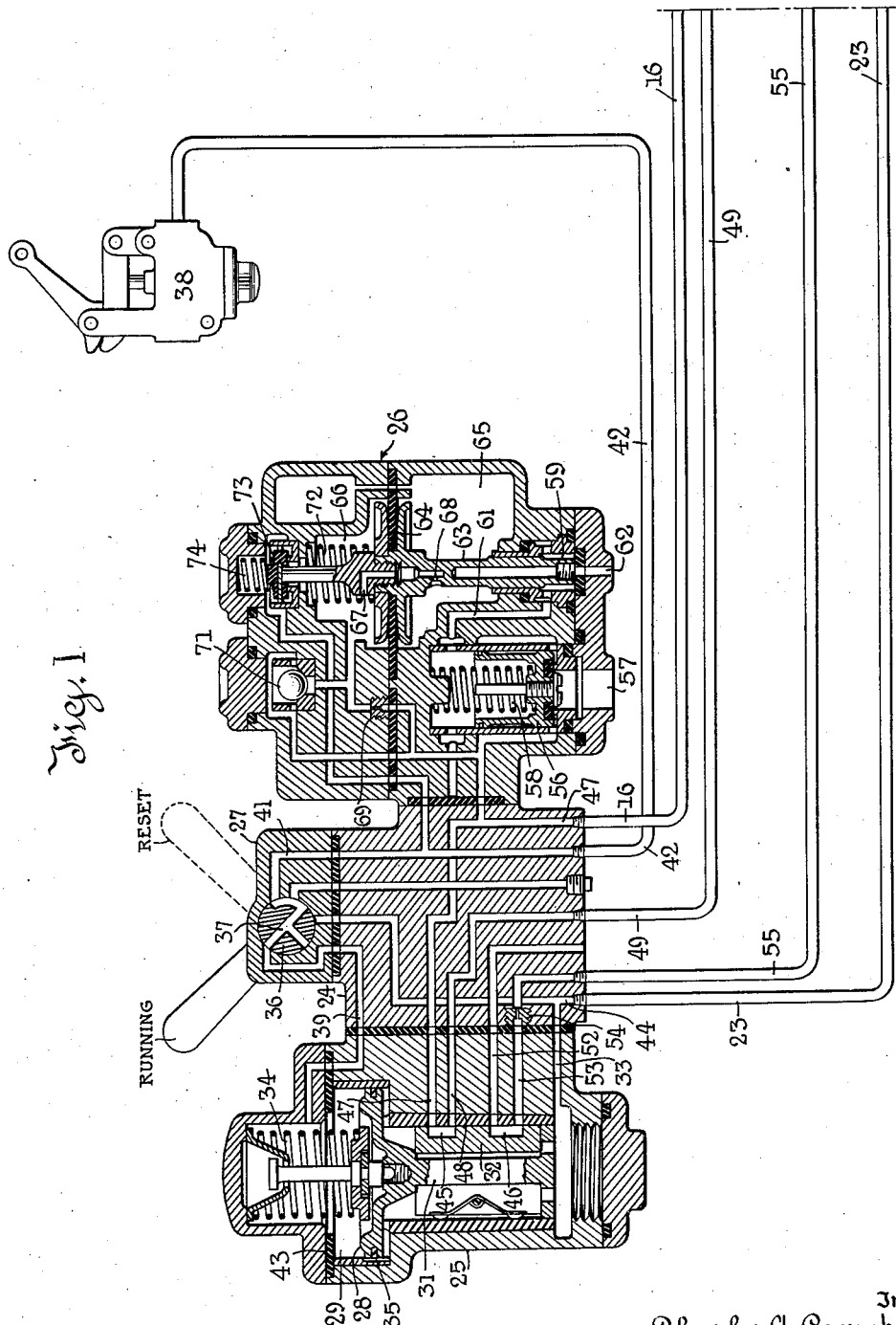
Figure 1 shows the application and vent valve and associated conductor's valve (on motor unit).

Figures 7, 8, 9, 10, and 11, are diagrams of the rotary valve of the engineer's brake valve (Figure 2) and respectively show the following positions, straight air lap; straight air service; automatic service lap; automatic service; emergency.

Generally stated, the apparatus in Figures 1 and 2 is directed primarily to control by the engineer; that in Figures 3 and 4 (other than the main reservoirs) is the control valve mechanism for the motor car; and that in Figures 5 and 6 is the control valve mechanism for the trailer car (and would be duplicated for additional trailers). The mechanism of Figures 3 and 4 is essentially identical with that in Figures 5 and 6 except that in the first the relay is supplied with air by the main reservoir, whereas in the second, the relay is supplied with air from a local reservoir charged from the brake pipe. Thus, two alternative arrangements are shown as approximate equivalents. It is undesirable to run a main reservoir pipe through the train if a local reservoir can be supplied on trailers and unnecessary to use a local reservoir on the motor car since the main reservoir is at hand.

Two pipes run through the train, a normally vented straight air pipe 15 and a normally charged brake pipe 16. To simplify the lettering, all branches of each pipe which are always in free communication therewith are similarly identified. Between cars, hose connections with detachable couplings are used according to accepted practice.

All compressed air for the system is furnished by a compressor (not shown), connected at 17 to high pressure main reservoir 18. This feeds a reduced pressure to main reservoir 19 through check valve 21 and pressure reducing valve 22. Reservoir 19 feeds the application valve and the engineer's brake valve through pipe 23.

*Application and vent valve*

The application and vent valve (Figure 1) essentially is that claimed in my application Serial No. 39,871, filed September 9, 1935, since issued on November 15, 1938, as Patent 2,136,581, and need be described only sufficiently to explain its functions.

The pipe bracket 24 carries at its left the application valve housing 25, at its right the vent valve housing 26 and at its top the reset valve housing 27. Housings 25 and 26 are formed of several parts, as shown. All pipe connections are made to the pipe bracket.

In housing 25 is piston 28 working in cylinder 29 and having stem 31 which confines and shifts slide valve 32. The piston 28 is subject on its lower face to pressure from reservoir 19 communicated by pipe 23 and port 33 to the slide valve chamber in which valve 32 is mounted. A spring 34 urges piston 28 downward to the normal position (Figure 1) in which groove 35 affords a by-pass around the edge of piston 28.

The reset cock 36 in housing 27 has a port 37 which in the normal running position of the cock (Figure 1) connects the space above piston 28 with the normally closed conductor's vent valve 38 (of usual form). Flow is via port 39, port 37, port 41, and pipe 42. Thus opening of valve 38 will cause piston to move to its upper limit of motion where it seals on gasket 43. Having so moved it will remain up until reset valve is turned to reset position in which port 37 connects port 39 with port 44 leading from reservoir pipe 23. This equalizes pressures on piston 28 so that spring 34 restores it to its normal lower position whereupon cock 36 should be restored to its normal running position.

The slide valve 32 has two cavities 45 and 46 each of which in the normal position of piston 28 connects two ports in the slide valve seat, but disconnects them in the upper (emergency) position of piston 28. Cavity 45 connects brake pipe port 47 leading from brake pipe 16 with port 48 leading by pipe 49 to brake pipe charging port 51 in the engineer's brake valve (Figure 2). Cavity 46 connects exhaust port 52, with emergency straight air port 53 connected through choke 54 with the emergency straight air pipe 55.

In the upper position of slide valve 32 it exposes port 53 admitting air from main reservoir 19 to pipe 55 at a rate controlled by choke 54. This produces a straight air application under decelerometer control as will later be more fully explained.

The main brake pipe vent valve on housing 26 is the poppet valve 56 controlling exhaust port 57 and urged closed by spring 58, also, under normal conditions, by brake pipe pressure which leaks between the valve and the guide bushing to charge the space behind the valve. Extensions of port 47 lead brake pipe air to the annular area around the seat of the valve and to other points in housing 26. The valve 56 opens when pilot valve 59 opens and vents the space behind valve 56, by way of port 61 and exhaust port 62.

The pilot valve 59 is formed on the end of a stem 63 which projects in both directions from thrust plates clamped to the center of flexible diaphragm 64. This diaphragm is interposed between a quick action chamber 65 and a brake pipe chamber 66. The quick action chamber 65 is charged by flow from the brake pipe chamber 66 through the charging port 67, the rate of charge being limited by the constriction 68. The brake pipe chamber 66 is in constant restricted communication with the brake pipe by way of port 47 and choke 69. A check valve 71 in a by-pass around the choke permits free flow from the chamber 66 toward the brake pipe but closes against flow in the reverse direction.

A spring 72 assists in closing the valve 59. Above the upper end of the stem 63 is a poppet or check valve 73 which is urged closed by a light spring 74. This valve is forced open by upward motion of the stem 63 and controls communication from chamber 66 to a branch of passage 41. This passage communicates by pipe 42 with the conductor's valve 38 and also with the space above the piston 28. Consequently, if diaphragm 64 moves upward as the result of a sudden reduction of the brake pipe pressure, stem 63 opens valve 73 so that not only the brake pipe but also the space above the application valve piston 28 is vented.

From this, it follows that a sharp reduction in brake pipe pressure whether produced by the conductor's valve 38 or by the engineer's brake valve, or by any other means, will entail rapid venting of the brake pipe by the vent valve and also the operation of the application valve to cut the engineer's brake valve out of control and to admit air to the straight air emergency pipe 55.

Engineer's brake valve

The engineer's brake valve is mounted in the body indicated generally at 75 and includes as its main controlling element, a rotary valve 76 turned by the key 77 on the lower end of stem 78. A manually shiftable handle 79 with the usual impositive detent is the means used for operating the rotary valve.

As stated, a simple valve having alternative straight air and automatic functions has been chosen for illustration without implying that the invention is limited to use with a valve of this type. The engineer's brake valve has six functional positions. Since the reservoir 19 supplies air at reduced pressure, there is no distinction between release and running conditions. Consequently, the first position which is shown in Figure 2 is a combined running and release position. The second position shown in Figure 7 is a straight air lap position. The third position, Figure 8, is a straight air service position. The fourth position, Figure 9, is an automatic lap position. The fifth position, Figure 10, is an automatic service position and the sixth position, Figure 11, is emergency position.

This last or emergency position involves the opening of a cam actuated poppet valve to vent the brake pipe. The stem 78 carries a sleeve 81 which rotates with the stem and is formed with a cam groove 82. Groove 82 receives the stem 83 of the poppet valve 84 and permits the valve to close in all positions except emergency. In emergency position, the stem 83 is forced back by the cam, unseating the valve 84. The opening of the valve connects brake pipe port 85 to the atmospheric exhaust port 86. Port 85 is in direct communication with a branch of the brake pipe 16.

The seat of the rotary valve 76 has in addition to the brake pipe charging port 51 already described, an equalizing reservoir port 87 which leads through pipe 88 to the equalizing reservoir 89 and to the pressure gauge 91. Port 51, it will be remembered is normally in communication with the brake pipe 16 by way of the cavity 45 in the application valve. There are two other ports in the seat of the rotary valve 76 and these are at atmospheric exhaust port 92 and the control port 93. The port 93 leads to the upper end of the double throw check valve 94 whose lower end is connected to a branch of pipe 55. Upon admission of pressure fluid to the control port 93, the valve element 95 of the double throw check valve 94 moves to its lower seat, blanking off the pipe 55 and connecting the engineer's brake valve with pipe 115 leading to the deceleration controller hereinafter described. Conversely, if the application valve makes its emergency response, it supplies air to the lower connection of the check valve so that the valve element 95 moves to its upper seat and connects the pipe 55 to the pipe 115 leading to the decelerometer.

Mounted in the lower part of the housing 75 is an equalizing discharge mechanism of conventional form, comprising equalizing piston 96 and discharge valve 97, the latter controlling flow from the space below the piston 96 to the atmosphere by way of the restricted discharge connection 98. The space above the piston 96 is in communication with the equalizing reservoir 89 which as usual serves as means to increase the effective volume of the space above the piston.

The pipe 23 supplies air from reservoir 19 to port 99 which leads to the space at the back of (i. e., below) the rotary valve 76. The porting of the rotary valve will be indicated diagrammatically.

In running position, Figure 2, straight air lap position, Figure 7, and straight air service position, Figure 8, a through port 101, in the rotary valve, supplies main reservoir air to the ports 51 and 87 so that the brake pipe and equalizing reservoir are charged in these three positions. In running position, Figure 2, control port 93 is connected to the exhaust port 92 by cavity 102. This exhaust connection is interrupted in straight air lap position (Figure 7), the ports 92 and 93 being blanked. In straight air service position (Figure 8), the port 92 is blanked and main reservoir air is supplied at a restricted rate to the control port 93 by means of the constricted through port 103.

In automatic lap position, ports 87 and 51 are blanked so that the pressure established in the control reservoir to control an automatic service application is trapped. At such time brake pipe pressure is subjected to control by the equalizing discharge valve. In automatic lap position, the cavity 104 connects ports 92 and 93 so that the control port is vented and consequently there is no tendency to produce straight air application.

In automatic service position in Figure 10, the ports 92 and 93 are still connected by the cavity 104 but a restricted extension 105 of this port registers with the equalizing reservoir port 87. Port 105 is the preliminary exhaust port and serves to reduce pressure in the equalizing reservoir in automatic service position. This reduction causes the equalizing discharge piston 96 to rise and open the equalizing discharge valve. The valve closes when brake pipe pressure has been reduced slightly below equalizing reservoir pressure.

As is usual with equalizing discharge valves, the rotary valve is moved to automatic service position until the gauge 91 shows the desired brake pipe pressure, at which time the rotary valve is returned to automatic lap position, trapping the desired pressure in the equalizing reservoir. In emergency position, Figure 11, the valve 84 is held open as already explained. The port 51 is blanked. The cavity 104 continues to connect the ports 92 and 93. An extension 100 registers with the equalizing reservoir port 87 to insure rapid venting of that reservoir and consequent opening of the equalizing discharge valve.

Deceleration controller

A housing, indicated generally by numeral 106, encloses the moving parts of the deceleration controller. This includes features described and claimed in my prior application, Serial No. 724,990, filed May 10, 1934, since issued on November 15, 1938, as Patent 2,136,578.

Mounted in valve seat bushing 107 in the housing 106 is a balanced piston valve 108 of the inside cut-off type. A branch of straight air pipe 15 leads to the middle port 109 and consequently is in constant communication with the reduced middle portion of valve 108. The longitudinal movements of the valve cause the valve to connect the port 109 selectively with an inlet port 111 and an exhaust port 112 which last leads to atmosphere through a spring loaded retaining valve 113. The valve 108 has the smallest practicable positive lap on the ports 111 and 112 so that only one of these ports can be connected at a given time with the straight air pipe 15. A release by-pass check valve 110 permits flow from the straight air pipe port 109, which is the middle port toward the supply port 111 but closes against flow in the reverse direction.

When the train is in motion, the brakes released, the valve 108 is held in the position shown in Figure 2 by the coil compression spring 114 so that port 111 communicates with port 109. Port 111 is connected by pipe 115 with the middle part of the double check valve 94.

One end of the spring 114 reacts against the valve 108. The opposite end is sustained by a cup-like piston 116 which works in cylinder 117 and may be forced to the left by pressure admitted through pipe 55 to the cylinder 117. It follows that when application piston 28 moves to its upper position as the result of an emergency reduction of brake pipe pressure, main reservoir air is admitted to the pipe 55. The double check valve 94 connects the pipe 55 with the inlet port 111 and at the same time, the piston 116 is shifted to increase the load on spring 114. This, it will be understood, increases the deceleration rate established by the decelerometer.

The element responsive to the deceleration rate is a heavy mass 118 mounted on and guided by ball bearing rollers 119 and so arranged that the weight is guided in the direction of the travel of the train. Consequently, when the train decelerates as the result of a brake application, the weight tends to move forward relatively to the train. This motion is communicated to the valve 108 by means of the lever 121 which is fulcrumed at 122 and is in thrust relation with the weight 118 and with the end of valve 108. Friction is reduced by the ball bearing thrust rollers 123 and 124.

The arrangement is such that the spring 114 resists the forward motion of the weight and the loading of the spring, which is adjustable by the piston 116, determines which of two deceleration rates will be maintained.

In my Patent 2,136,578, above identified, dual adjusting means are proposed but a single adjusting means is sufficient to develop the operating characteristics of the present invention and is illustrated in the interest of simplicity.

*Local relay*

Each unit in the train is provided with a brake controlling unit made up essentially of a brake controlling valve device such as a triple valve and a local relay. This relay may be controlled either directly by the straight air pipe or on the automatic principle by the triple valve. There is also a relief valve mechanism which together with certain features of the local relay individually and jointly are involved in the principal inventive aspects of the present disclosure. The relay will be discussed first. The relay for the motor car is shown in Figure 3, to which reference should now be made.

A pipe bracket 125 supports the housing 126 of the double diaphragm relay. This housing is constructed in a number of parts, as shown on the drawings, but the details of the housing are not matters of invention and need not be discussed.

Formed in the pipe bracket 125 is a chamber 127 whose outer side is bounded by a flexible diaphragm 128. The diaphragm is protected and its outward motion is limited by cover 129 having an atmospheric vent as shown. The diaphragm is drawn inward, that is, toward the position shown in Figure 3, by a flat coiled spring 131 so that the normal position of the diaphragm is the position shown in which the chamber 127 has its minimum volume.

A port 132 leads to the chamber 133 beneath the relay diaphragm 134. There is a larger relay diaphragm 135 above the diaphragm 134, the two diaphragms defining an intervening chamber 136.

In the present discussion, it will be assumed that the effective area of the diaphragm 134 is 60% of the effective area of the diaphragm 135 but this ratio is subject to variation and the value chosen is merely suggestive. The space 137 communicates freely with the chamber 138 immediately above the diaphragm 135 and both spaces are connected by the port 139 and pipe 141 with the brake cylinder 142.

A center plate structure 143 is clamped to the middle of the diaphragm 134 and there are thrust plates 144 and 145 below and above the diaphragm 135. The lower plate 144 engages a stop to limit downward motion of the diaphragm 135 and also enters into thrust engagement with the center plate structure 143 of the lower diaphragm. The upper plate 145 is in thrust engagement with the valve actuating stem 146 which is urged downward by a coil compression spring 147. The upper end of the stem 146 is guided for longitudinal reciprocation at 148. Thus, fluid pressure acting in chamber 136 has a one to one ratio to brake cylinder pressure acting in the chamber 138. On the other hand, if the chamber 136 is at atmospheric pressure and pressure fluid is admitted to the chamber 133, the effective ratio is six-tenths to one as between pressure in chamber 133 and brake cylinder pressure acting in chamber 138.

The proportion or ratio of the pressure established by the relay to the pressure which causes the relay to act is variable as above stated and for lack of a better term this ratio is called the "ratio of response" of the relay. While the double diaphragm relay above described is probably the simplest available mechanism for permitting variation of the ratio of response, others are known and might be adapted to the purpose.

A branch of the straight air pipe 15 is connected by port 149 with the chamber 136 between the diaphragms and the chamber 133 below the smaller diaphragm is connected by port 132 and pipe 151 with a port in the triple valve hereinafter described.

The valve actuating stem 146 carries pivoted to it at 152, a rocking cross lever 153 whose function on upward movement of the actuator 146 is first to close an exhaust valve controlling exhaust from the chamber 137 (and consequently from the brake cylinder), and then to open an admission valve to admit fluid from a source of fluid pressure to the chamber 137 (and consequently to the brake cylinder). This valve mechanism is well-known and hence need be only briefly described.

The left end of the lever 153 is normally positioned by an adjustable stop 154 so that the inlet valve can close. The right end engagse a spring buffer 155 which is overpowered by the spring 147 when actuator 146 is allowed to move downward. The right end of the lever 153 engages the longitudinally reciprocating stem 156 so that when the actuator 146 moves upward, it first closes a pilot exhaust valve 157 and then on further movement, closes the main exhaust valve 158.

After the latter valve has been seated, the stem 156 is at its limit of upward motion, so that continued upward motion of the actuator stem 146 forces the stem 159 of the inlet valve mechanism upward. The first effect is to open the pilot admission valve 169. This relieves fluid pressure behind the cup-shaped main admission valve 171 so that the main admission valve opens freely. This result is secured, by interposing a choke 172 between the main air supply passage 173 and the space behind the main admission valve 171. The purpose is to bias the admission valve in a closing direction when it is closed and at the same time permit it to open quite freely upon the opening of the pilot valve 169. This has a small area subject to supply pressure and consequently opens with slight resistance when subjected to upward force. Springs are used to bias both the pilot and main admission valve in a closing direction, and such springs are clearly shown on the drawings. No springs are needed or used on the exhaust valve.

The supply passage 173 is connected by port 174 and pipe 175 with the high pressure main reservoir 18. It will be readily understood that the relay will operate to establish in the brake cylinder a pressure which is substantially equal to that established in the chamber 136 or a pressure equal to six-tenths of that established in the chamber 133, depending upon which chamber is charged.

Triple valve

The triple valve mechanism as shown in Figure 4 is mounted on a pipe bracket 176 shown as distinct from the pipe bracket 125. In actual practice, these two pipe brackets can be constructed as a single unit but for convenience of illustration, they are shown as separate units. It is immaterial from an operative standpoint which arrangement is used.

Connected to the bracket 176 are branches of the brake pipe 16 and of the straight air pipe 15, also the pipe 151 leading from the relay chamber 133, an auxiliary reservoir pipe 180 leading to the auxiliary reservoir 177 and an emergency reservoir pipe 178 leading to the emergency reservoir 179. The emergency reservoir is normally substantially larger than the auxiliary reservoir.

The triple valve is enclosed in a housing 181 mounted on one face of the pipe bracket 176. It includes the usual triple piston 182 working in a cylinder bushing 183 and adapted in its left hand (emergency position) to seal against a gasket 184 which also serves to seal the body 181 to the bracket 176.

There is a charging port 185 which communicates with the auxiliary reservoir port 186 through a check valve 187 opening toward that port. The port 186 communicates with the auxiliary reservoir pipe 180 and also with the slide valve chamber 188. A choke 189 in a by-pass around the check valve 187 limits the back flow and consequently determines the sensitiveness of the triple valve in responding to minor reductions of brake pipe pressure.

A spring-held graduating cup 191 tends to arrest the piston 182 in service position and yields to let it move to emergency position. The piston 182 has a stem 192 with the usual shoulder and spider between which the slide valve 193 is mounted. The spacing of the shoulder and spider is such that the slide valve has a slight lost motion relatively to the piston, sufficient to permit the graduating valve 194, which is closely confined in a notch in the stem 192, to open and close the service port 195. A port 196 in the seat for the main slide valve communicates with the pipe 151 already described and in the release position of the triple valve (as shown in Figure 4), a cavity 197 in the slide valve connects the port 196 with an atmospheric exhaust port 198.

In release position, an emergency reservoir port 199 in the seat which communicates with the emergency reservoir 179 by way of pipe 178, registers with the emergency reservoir charging port 201 in the slide valve. The upper end of this port is exposed by the graduating valve 194 in release and recharge position (Figure 4). Initial movement of the piston 182 from release toward service position causes the graduating valve 194 to close the charging port 201 and open the service port 195 so that when this service port registers with port 196, the graduating valve 194 is positioned to perform the usual graduating functions. In service position, port 199 is blanked by the slide valve.

In emergency position, an emergency reservoir port 202 registers with port 199 and connects the emergency reservoir 179 with the slide valve chamber 188 so that both reservoirs furnish air to the slide valve chamber from which it flows directly to port 196; that port being exposed to the slide valve chamber by the recess 203 formed in the end of the slide valve for that purpose.

From the above description, it will be observed that the triple valve is simply a graduating triple valve having service and emergency positions which are differentiated by the fact that in service position only the auxiliary reservoir supplies air, whereas in emergency position, both the auxiliary and emergency reservoirs supply air.

Valves of this type are well-known and, as stated, the triple valve in the present disclosure merely typifies any triple valve. There is nothing in the invention to exclude the use of those more highly refined types of triple valves well-known in the art. The addition of well-known refinements now in extensive use adds the benefit of those refinements, but does not affect the principle of the present invention.

The relay and the triple valve unit for a trailing car or cars (see Figures 5 and 6), are identical with the corresponding parts on the motor car above described, except for the fact that on the motor car, air for the brake cylinder is taken directly from the main reservoir, whereas on the trailing cars, a local reservoir is fed from the train pipe to perform this function. This is simpler than the known alternative of running a main reservoir pipe the length of the train.

In Figure 4, a branch of port 186 is shown blanked by a cap 204; the outer end of this branch being tapped as indicated at 205.

In Figure 6, however, a choke 206 is shown screwed into the tapped opening 205 and in place of the blanking cap 204, a fitting 207 with charging check valve 208, is substituted. This permits flow from the auxiliary reservoir port 186 to a local reservoir port 209 at a rate controlled by the choke 206.

Port 209 is connected by pipe 211 with the local reservoir 212 and with the supply port 174 in the trailer relay bracket 125.

In Figures 5 and 6 parts identical with parts on Figures 3 and 4 are given the same reference numerals. The operating characteristics are the same, except that the source of braking air is different on the trailer unit from the source of braking air on the motor unit.

There is an advantage in charging the local reservoir 212 from the auxiliary reservoir port 186 because the local reservoir derives some air from the auxiliary reservoir during applications and consequently tends to reduce auxiliary reservoir pressure. This stabilizes the triple valve in the trailer in its release position during strictly straight air operations and eliminates any tendency of the triple valve to move toward its application position as it might tend to do if the local reservoir were charged directly from the brake pipe 16. It should be observed that in staight air applications, depletion of reservoir pressures, causes them to draw on the brake pipe on trailers (but not on the motor car). This reduction of brake pipe pressure toward the rear of the train might cause response of the triple valves except for the fact that the arrangement shown also causes reduction of reservoir pressures.

*Conductor's valve on trailer*

A conductor's vent valve 38a, identical with the vent valve 38 of Figure 1, is used on the trailer unit and controls a vent valve 26a. This is structurally identical with the vent valve shown in Figure 1 and corresponding parts are identified by the reference numerals used in Figure 1 with the letter "a".

The vent valve 26a is mounted on a bracket 213 and the connection between the vent valve 38a and the bracket is made by means of a pipe 214. The brake pipe 16 is connected to the port 47a exactly as in Figure 1 but the pipe 214 communicates by a passage 215 with the passage 61a.

A check valve 216 is interposed in this connection. Operatively, there is no great difference. The vent valve is put into operation in a slightly different manner upon operation of the conductor's valve 38a but the ultimate function is the same.

The opening of the valve 38a vents port 61a and consequently, the space behind the vent valve 56a.

The local reduction of brake pipe pressure causes the diaphragm 64a to open the pilot valve 59a which assures continued opening of the main valve 56a. The purposes of the check valve 216 is to prevent a momentary back-flash of pressure from the pipe 214 in the event that the brake pipe 16 is suddenly vented by means other than this particular vent valve. This back-flash is likely to occur if the pipe 214 is long, and its effect would be to retard the opening of the pilot valve 59a and hence make the response of the vent valve sluggish.

*Safety valve control mechanism*

The safety valve control mechanism is enclosed in the housing 217 which is mounted on one of the faces of the pipe bracket 176 and sealed thereto by means of a gasket 218. The mechanism is the same on the motor car and on the trailer and reference may therefore be made to either Figure 4 or Figure 6.

A branch of the port 196 leads to a chamber 219 surrounding the cut-off valve 221. The cut-off valve 221 is of the cup-poppet type and is urged in the closing direction by a light spring 222. It controls passage 223 leading to a blow-down or safety valve 224 set to retain a pressure here assumed to be 60 lbs. per square inch.

A stem 225 on the center plate structure of flexible diaphragm 226 obstructs closing movement of valve 221 when the diaphragm is held in its normal lower position by coil compression spring 227. The spring 227 has sufficient strength to do this when the pressure above the diaphragm is approximately as high as that below the diaphragm.

The brake pipe 16 communicates with a passage leading to the space on the upper side of a double throw check valve 228. The valve is biased toward its lower position by a coil compression spring 229. In its lower position, shown on the drawings, it connects the brake pipe with the port 231 leading to the space above the diaphragm 226. This connection is made through side ports in the guide bushing in which the double throw check valve 228 works. However, when a superior pressure is developed in the chamber 232, this pressure acting on the lower side of the check valve 228 may shift valve 228 to its upper seat, disconnecting the brake pipe from the space above the diaphragm 226 and connecting the chamber 232 to that chamber.

The straight air pipe 15 is connected to a port which leads to the space 233 above a flexible diaphragm 234. Beneath this diaphragm is a thrust plate carried by a valve stem 235. This stem is normally held in its upper position by a coiled compression spring 236 which urges in a closing direction the poppet valve 237, the poppet valve 237 being in thrust relation with the lower end of the stem 235. The space below the diaphragm 234 is always vented to atmosphere by way of the exhaust port 238. The construction is such that in the absence of pressure in the straight air pipe 15, the chamber 219 is disconnected from chamber 232 and the latter is vented to atmosphere through the valve 235 and exhaust port 238. However, if pressure is developed in the straight air pipe 15, downward motion of the diaphragm 234 connects chamber 219 to chamber 232 and disconnects chamber 232 from the exhaust port 238 by means of valve 240.

*Assumed proportions used for description of operation*

For the purpose of description only, certain assumptions as to volumes and pressures will be made without meaning to imply that these quantitative relationships are essential.

We will start with the assumption that it is desired to have a 90% braking ratio in a full service application, 150% braking ratio during the full automatic emergency application, and a maximum of 250% braking ratio in a straight air application, under decelerometer control. There also should be means for reducing this maximum ratio to 150% braking ratio if the straight air line is interrupted during an emergency application initiation on the automatic side, as might occur from some accidental cause.

Pressure in reservoir 19 will be assumed at 110 lbs. per square inch. It has already been assumed that the differential ratio between the diaphragm 134 and the diaphragm 135 is six-tenths to one and that the setting of the safety valve 224 is 60 lbs. per square inch.

It will be observed that the auxiliary reservoir does not furnish air to the brake cylinder, but only to the relay, and that consequently its volume may be small. Thus, full equalization between the auxiliary reservoir and volume chamber 127 and the relay chamber 133 need occur only slightly above the 60 lbs. setting of the valve 224.

The volume of the emergency reservoir may conveniently be so chosen that full equalization between this reservoir, the auxiliary reservoir volume chamber 127, and chamber 133, will occur at 100 lbs. per square inch.

The comparatively small size of the auxiliary reservoir and the emergency reservoir is important because the safety valve 224 acts to discharge air from these reservoirs during certain types of application. The small size minimizes the waste of air.

*Straight air operation initiated by the engineer's brake valve*

When the engineer moves his brake valve to straight air service position, Figure 8, it will start to develop pressure in the straight air pipe 15; the flow being by way of port 103 to port 93 to pipe 115 past the decelerometer valve 108 to pipe 15 and thence to the chamber 136 below the large diaphragm 135. It follows that braking pressure will build up in direct proportion to straight air pipe pressure until a rate of deceleration is established sufficient to cause the decelerometer to respond. This response will be at the lower deceleration rate because no air is admitted behind the piston 116. Thereafter, the engineer's brake valve is cut out of control by the intercepting action of the decelerometer and the decelerometer gradually reduces pressure in the straight air pipe 15 to maintain a uniform rate of deceleration.

On the motor unit, the braking air will be taken from the main reservoir 18 but on the trailer unit it will be taken from the local reservoir 212 and from the connected auxiliary reservoir 177 which is then connected to the brake pipe 16 through charging port 185. Since the local reservoir draws from auxiliary reservoir and only indirectly from the brake pipe, the triple valve is stabilized in release position. The stabilization is not necessary on the leading unit of the train because the engineer's brake valve feeds the brake pipe 16 in both straight air positions and no brake applying air is there drawn from the brake pipe.

The diaphragm 234 and the by-pass valve will be forced down, but nothing will happen in consequence, since chamber 219 is at atmospheric pressure, being vented to atmosphere through the cavity 197 in the triple slide valve. The double check valve 228 is held downward by brake pipe pressure and the decelerometer maintains control to a stop unless the engineer's brake valve be moved to release position. In such case, the release by-pass valve 110 permits the release flow to occur.

*Automatic service*

In an automatic service application, brake pipe pressure is gradually reduced. The straight air pipe 15 remains at atmospheric pressure and auxiliary reservoir air is supplied by way of ports 195 and 196, and pipe 151 to the space 133 beneath the small diaphragm 134. If this proceeds to full equalization between brake pipe 16, auxiliary reservoir 177, chamber 219, chamber 127, and chamber 133, the pressures on the diaphragm 226 will be obviously equal, the valve 221 will be held open and safety valve 224 will limit or reduce the pressure to 60 lbs. Thus, we have not more than 60 lbs. in the chamber 133 and because of the six-tenths ratio, the relay will be so designed that this corresponds to a 90% braking ratio. Thus, a full service application is limited to a 90% braking ratio.

*Emergency application*

Assume that an emergency application is initiated for any cause. There are several possibilities, such as movement of the engineer's brake valve to emergency position, operation of either conductor's valve 38 or 38a, or rupture of the brake pipe. Irrespective of how the emergency is initiated, the application valve piston 28 will move upward and will admit main reservoir pressure to straight air emergency line 55. This sets the decelerometer for the higher rate and admits main reservoir air to pipe 15 at an emergency rate. The venting of the brake pipe will cause the triple valve to move to emergency.

There are two possible ensuing conditions. First, a normal condition in which pressure on the straight air pipe 15 will build up (i. e., the straight air pipe is intact and unobstructed); and second, pressure does not develop in the straight air line pipe 15 (because this is ruptured or obstructed). The two cases will be discussed separately.

It will simplify the explanation to describe first what happens if pressure does not develop in the straight air pipe.

In such a case, the venting of the brake pipe 16 causes the triple valves to move into emergency position. Both reservoirs 177 and 179 are connected with chamber 219, chamber 127 and chamber 133.

As assumed, full equalization will occur at 100 lbs. The brake pipe is vented so that shortly after initiation of emergency, the pressure above the diaphragm 226 falls to atmospheric. Consequently, this diaphragm moves up permitting valve 221 to close. Hence, the safety valve 224 cannot reduce the 100 lb. pressure.

It follows that 100 lbs. per square inch acts upward on the diaphragm 134 and because of the six-tenths to one ratio, produces a braking pressure of 60 lbs. corresponding to a braking ratio of 150%. Consequently, in an automatic emergency, the train will be braked with a 150% ratio, which is low enough to guard against sliding wheels.

This will always be the maximum available braking ratio if the system is being operated as an automatic system through the brake pipe 16 alone.

If the straight air pipe is intact, the response of the application valve will admit air to the straight air emergency pipe 55 supplying air to the straight air pipe under decelerometer control and charging cylinder 117 so that the decelerometer controller is set for its highest deceleration rate.

The development of straight air pipe pressure involves the development of pressure in the chamber 233 above the diaphragm 234 so that pressure from chamber 219 is admitted to chamber 232. Since the brake pipe is vented, only the spring 229 now resists upward motion of the double check valve 228, and this valve moves to its upper seat and admits braking pressure by way of port 231 to the space above diaphragm 226, equalizing the pressures above and below this diaphragm. Consequently, spring 227 shifts the diaphragm to its lower position and maintains valve 221 wide open.

The safety valve 224 starts to bleed the pressure in the chamber 133 to 60 lbs., while the pressure in the chamber 136 is under control of and hence is reduced gradually by the decelerometer. Consequently, in the first portion of the stop, there will be a very high braking ratio because the pressure in the straight air pipe 15 acting in the chamber 136 gives a one-to-one brake cylinder pressure in chamber 138.

Assuming the development of 100 lbs. in the straight air pipe, the maximum possible braking pressure will be 100 lbs., giving a braking ratio of 250%. It is characteristic of the decelerometer controller, that it functions to reduce pressure in the straight air pipe 15 and in the chamber 136 between the diaphragms. However, it cannot reduce the effective braking pressure below the 36 lbs. entailed by the pressure of 60 lbs. pressure in the chamber 133 below the small diaphragm.

Consequently, in a straight air application, initiated through an automatic emergency, the braking ratio may initially be as high as 250%. It will be gradually reduced by the operation of the decelerometer, but it cannot be reduced thereby below the 90% braking ratio. In other words, the decelerometer cannot reduce brake cylinder pressure below 36 lbs. and this braking effect will persist to a stop.

To sum up, a strictly straight air service application, initiated at the engineer's brake valve can start with a braking ratio as high as 250% and can be controlled by the decelerometer to maintain a uniform decelerometer rate to the stop. A full service application cannot produce a braking ratio higher than 90%. An automatic emergency application without the development of the straight air function will give a braking ratio of 150% maintained to a stop. An automatic emergency application followed by the development of a straight air application can have a maximum braking ratio of 250% with modulated decelerometer control down to a braking ratio of 90% which is then retained.

The chamber 127 with the diaphragm 128 is not essential to the operation of the equipment shown in the application drawings except when cars having the improved brake are used in trains with cars having conventional automatic brake systems such as UC valves and the like.

The function of the chamber 127 is to time the application on cars equipped according to the present invention, with the application on cars equipped with the conventional automatic brakes. The purpose is to delay the response of the improved equipments. The use of this variable volume chamber is a known expedient for this purpose.

*General considerations*

The utility of the invention will now be apparent.

An important factor of the invention is that when operating as an automatic system, service pressure and emergency pressures are limited to safe values without requiring any change in main reservoir pressure.

The invention provides automatic means which will reduce braking ratios whenever the system operates as an automatic system and still permit the high ratios desired when straight air, deceleration controlled applications are used.

As already suggested, these requirements are encountered in a number of circumstances. In the example chosen for illustration, an engineer's brake valve is capable of exercising, at the will of the operator, either straight air or automatic function. In the A. H. S. C. system, use is made of a convertible brake valve which may be set to control on either basis.

In double heading a high speed train with a steam locomotive, the automatic brake valve in the double heading locomotive may control the entire system. Such a locomotive may control a train of cars, some of which have the equipment shown in Figures 5 and 6. Under the last named conditions, these valves are to be properly timed with conventional triple valves. In all cases mentioned, the braking ratio is automatically held within safe limits.

These possibilities will be readily understood by persons skilled in the art. It is impractical to illustrate every environment in which the invention may be used, but the disclosure here given shows all characteristic functions of the invention and demonstrates that the scheme is available for use in the form shown under virtually every contingency that might be met under interchange conditions in American railways.

In the claims, the term "triple valve" will be used in a generic sense as indicating a brake controlling valve device of the automatic type.

What is claimed is:

1. A fluid pressure brake system, comprising in combination, a normally vented straight air pipe; a normally charged brake pipe; means for controlling pressures in said pipes; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure; and connections for subjecting one abutment of the relay to pressure controlled by the triple valve, and the other to pressure in the straight air pipe.

2. A fluid pressure brake system, comprising in combination, a normally vented straight air pipe; a normally charged brake pipe; means for controlling pressures in said pipes; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure, said abutments being of unequal effective areas; and connections for subjecting the abutment of smaller area to pressure controlled by the triple valve and the abutment of larger area to pressure in the straight air pipe.

3. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure; and connections for subjecting one abutment of the relay to pressure controlled by the triple valve, and the other to pressure in the straight air pipe.

4. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure, said abutments being of unequal effective areas; and connections for subjecting the abutment of smaller area to pressure controlled by the triple valve and the abutment of larger area to pressure in the straight air pipe.

5. A fluid pressure brake system, comprising in combination, a normally vented straight air pipe; a normally charged brake pipe; means for controlling pressures in said pipes; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure; connections for subjecting one abutment of the relay to pressure controlled by the triple valve, and the other to pressure in the straight air pipe; and a safety valve for limiting the pressure acting on one of said abutments.

6. A fluid pressure brake system, comprising in combination, a normally vented straight air pipe; a normally charged brake pipe; means for controlling pressures in said pipes; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure, said abutments being of unequal effective areas; connections for subjecting the abutment of smaller area to pressure controlled by the triple valve and the abutment of larger area to pressure in the straight air pipe; and a safety valve for limiting the pressure acting on the smaller of said abutments.

7. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure; connections for subjecting one abutment of the relay to pressure controlled by the triple valve, and the other to pressure in the straight air pipe; and means responsive to deceleration produced by a brake application and serving to modulate pressure in the straight air pipe.

8. A fluid pressure brake system, comprising in combination a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure, said abutments being of unequal effective areas; connections for subjecting the abutment of smaller area to pressure controlled by the triple valve and the abutment of larger area to pressure in the straight air pipe; and means responsive to deceleration produced by a brake application and serving to modulate pressure in the straight air pipe.

9. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure; connections for subjecting one abutment of the relay to pressure controlled by the triple valve, and the other to pressure in the straight air pipe; a safety valve for limiting the pressure acting on one of said abutments; and means responsive to deceleration produced by a brake application and serving to modulate pressure in the straight air pipe.

10. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve and associated reservoir operatively related to the brake pipe; a source of pressure fluid for applying the brakes; a brake cylinder; a relay for admitting pressure fluid from said source to the brake cylinder, and for exhausting pressure fluid from the brake cylinder, said relay including two movable abutments, either of which may actuate the relay when subjected to fluid pressure, said abutments being of unequal effective areas; connections for subjecting the abutment of smaller area to pressure controlled by the triple valve and the abutment of larger area to pressure in the straight air pipe; a safety valve for limiting the pressure acting on the smaller of said abutments; and means responsive to deceleration produced by a brake application and serving to modulate pressure in the straight air pipe.

11. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure; connections for subjecting one of said abutments to brake controlling pressure developed by the triple valve and the other of said abutments to pressure in the straight air pipe; a safety valve arranged to limit the brake controlling pressure developed by said triple valve; and means responsive at least in part to brake pipe pressure and serving to permit action of said safety valve in service reductions and inhibit such actions in emergency reductions of brake pipe pressure.

12. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure, said abutments being of unequal effective areas; connections for subjecting the smaller one of said abutments to brake controlling pressure developed by the triple valve and the other of said abutments to pressure in the straight air pipe; a safety valve arranged to limit the brake controlling pressure developed by said triple valve; and means responsive at least in part to brake pipe pressure and serving to permit action of said safety valve in service reductions and inhibit such actions in emergency reductions of brake pipe pressure.

13. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure; connections for subjecting one of said abutments to brake controlling pressure developed by the triple valve and the other of said abutments to pressure in the straight air pipe; a safety valve arranged to limit the brake controlling pressure developed by said triple valve; and means responsive to brake pipe pressure and to straight air pipe pressure and serving to permit action of said safety valve in service reductions of brake pipe pressure, and to inhibit such action in emergency reductions of brake pipe pressure, at least until a substantial straight air pipe pressure has been developed.

14. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure, said abutments being of unequal effective areas; connections for subjecting the smaller one of said abutments to brake controlling pressure developed by the triple valve and the other of said abutments to pressure in the straight air pipe; a safety valve arranged to limit the brake controlling pressure developed by said triple valve; and means responsive to brake pipe pressure and to straight air pipe pressure and serving to permit action of said safety valve in service reductions of brake pipe pressure, and to inhibit such action in emergency reductions of brake pipe pressure, at least until a substantial straight air pipe pressure has been developed.

15. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; means responsive to the deceleration produced by a brake application and adapted to modulate braking pressure in the straight air pipe to control the rate of deceleration produced by straight air braking; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure; connections for subjecting one of said abutments to brake controlling pressure developed by the triple valve and the other of said abutments to pressure in the straight air pipe; a safety valve arranged to limit the brake controlling pressure developed by said triple valve; and means responsive at least in part to brake pipe pressure and serving to permit action of said safety valve in service reductions and inhibit such actions in emergency reductions of brake pipe pressure.

16. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; means responsive to the deceleration produced by a brake application and adapted to modulate braking pressure in the straight air pipe to control the rate of deceleration produced by straight air braking; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure, said abutments being of unequal effective areas; connections for subjecting the smaller one of said abutments to brake controlling pressure developed by the triple valve and the other of said abutments to pressure in the straight air pipe; a safety valve arranged to limit the brake controlling pressure developed by said triple valve; and means responsive at least in part to brake pipe pressure and serving to permit action of said safety valve in service reductions and inhibit such actions in emergency reductions of brake pipe pressure.

17. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; means responsive to the deceleration produced by a brake application and adapted to modulate braking pressure in the straight air pipe to control the rate of deceleration produced by straight air braking; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure; connections for subjecting one of said abutments to brake controlling pressure developed by the triple valve and the other of said abutments to pressure in the straight air pipe; a safety valve arranged to limit the brake controlling pressure developed by said triple valve; and means responsive to brake pipe pressure and to straight air pipe pressure and serving to permit action of said safety valve in service reductions of brake pipe pressure, and to inhibit such action in emergency reductions of brake pipe pressure, at least until a substantial straight air pipe pressure has been developed.

18. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; means responsive to the deceleration produced by a brake application and adapted to modulate braking pressure in the straight air pipe to control the rate of deceleration produced by straight air braking; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure, said abutments being of unequal effective areas; connections for subjecting the smaller one of said abutments to brake controlling pressure developed by the triple valve and the other of said abutments to pressure in the straight air pipe; a safety valve arranged to limit the brake controlling pressure developed by said triple valve; and means responsive to brake pipe pressure and to straight air pipe pressure and serving to permit action of said safety valve in service reductions of brake pipe pressure, and to inhibit such action in emergency reductions of brake pipe pressure, at least until a substantial straight air pipe pressure has been developed.

19. A fluid pressure brake system, comprising in combination, a normally vented straight air pipe; a normally charged brake pipe; means operable alternatively to reduce pressure in the brake pipe, or develop pressure in the straight air pipe, or vent the brake pipe and simultaneously establish pressure in the straight air pipe; a triple valve with associated reservoirs operatively related to the brake pipe, and having a service position in which it develops a moderate brake controlling pressure and an emergency position in which it develops a higher brake controlling pressure; a source of pressure fluid for applying the brakes; a brake cylinder; a relay for admitting pressure fluid from said source to the brake cylinder and for exhausting pressure fluid from the brake cylinder, said relay including two movable abutments either of which may actuate the relay when subjected to fluid pressure, said abutments being of unequal effective areas; connections for subjecting the smaller one of said abutments to brake controlling pressure developed by the triple valve and the other of said abutments to pressure in the straight air pipe; and a safety valve arranged to limit the brake controlling pressure developed by said triple valve.

20. The combination with a braking installation of that type in which a deceleration controlled straight air system and an automatic system both operate through a relay which is common to the two systems and controls braking pressure, of means interposed between one of said systems and said relay to modify the proportional relation between the pressure which that system develops on the relay and the pressure which the relay establishes in response thereto.

21. The combination with a braking installation of that type in which a deceleration controlled straight air system, and an automatic system both operate through a relay which is common to both systems and controls braking pressure, of means interposed between the automatic system and said relay to reduce the proportional relation between the pressure established by the relay and the controlling pressure exerted by that system on the relay.

22. The combination with a braking installation of that type in which a deceleration controlled straight air system including a straight air pipe, and an automatic system including a brake pipe and a triple valve having service and emergency functions, both operate through a relay which is common to the two systems and controls braking pressure; of valve means for limiting braking pressures established by said triple valve; and means responsive to brake pipe pressure and straight air pipe pressure, and serving to permit the limiting valve means to function as brake pipe pressure is reduced to equalization, and inhibit its action when brake pipe pressure is reduced substantially below equalization unless the straight air pipe is concurrently charged.

23. The combination with a braking installation of that type in which a deceleration controlled straight air system including a straight air pipe, and an automatic system including a brake pipe and a triple valve having service and emergency functions, both operate through a relay which is common to the two systems and controls braking pressure; of means interposed between said triple valve and the relay to reduce the proportional relation between the pressure established by the relay and the controlling pressure developed on the relay by the triple valve; valve means for limiting controlling pressure developed by said triple valve; and means responsive to brake pipe pressure and to straight air pipe pressure, and serving to permit the limiting valve means to function as brake pipe pressure is reduced to equalization and inhibit its action when brake pipe pressure is reduced substantially below equalization unless the straight air pipe is concurrently charged.

24. The combination with a brake installation including a straight air system having a normally vented straight air pipe, an automatic system having a normally charged brake pipe, and a relay associated with both systems so as to be operable by either to produce and control a brake application; of limiting valve means controlling the operating pressure developed on said relay by said automatic system; a normally inactive intercepting means which when active inhibits the action of said limiting means; means responsive to an emergency reduction of brake pipe pressure for rendering said intercepting means active; and means responsive to the development of pressure in the straight air pipe for neutralizing the last named means.

25. The combination with a brake installation including a straight air system having a normally vented straight air pipe, an automatic system having a normally charged brake pipe, and a relay associated with both systems so as to be operable by either to produce and control a brake application; of limiting valve means controlling the operating pressure developed on said relay by said automatic system; a normally inactive intercepting means which when active inhibits the action of said limiting means; pressure controlled means normally subject to brake pipe pressure and responsive to an emergency reduction of brake pipe pressure for rendering said intercepting means active, and means responsive to the development of pressure on the straight air pipe, for isolating the last named means from the brake pipe, and subjecting it to pressure sufficient to cause it to render the intercepting means inactive.

26. In a fluid pressure system of the type comprising a deceleration controlled straight air system having a normally vented straight air pipe, an automatic system having a normally charged brake pipe and a relay arranged to be controlled by each system to establish and control braking pressures; of limiting means controlling pressures developed by the automatic system on said relay; and means controlled by brake pipe and straight air pipe pressures, serving when brake pipe pressure is reduced but not beyond equalization and the straight air pipe is not charged to render said limiting means active to set a low maximum limit in the application, serving when brake pipe pressure is below equalization and straight air pipe is not charged to render the limiting means inactive, and serving when brake pipe pressure is below equalization and straight air pipe is charged to impose a minimum limit on the straight air release of the brakes incident to deceleration control.

27. The combination of a deceleration controlled straight air brake system having a normally vented straight air pipe; an automatic air brake system having a normally charged brake pipe, an auxiliary reservoir and a triple valve associated with said reservoir and brake pipe and arranged to develop an application controlling pressure; and a relay and associated pressure fluid source for developing braking pressure, said relay having a movable actuating abutment subject to the opposing effects of braking pressure and pressure in said straight air pipe, and an auxiliary movable actuating abutment subject to application controlling pressures developed by said triple valve, and in thrust relation with the first named abutment.

28. The combination of a deceleration controlled straight air brake system having a normally vented straight air pipe; an automatic air brake system having a normally charged brake pipe, an auxiliary reservoir and a triple valve associated with said reservoir and brake pipe and arranged to develop an application controlling pressure; and a relay and associated pressure fluid source for developing braknig pressure, said relay having a movable actuating abutment subject to the opposing effects of braking pressure and pressure in said straight air pipe, and an auxiliary movable actuating abutment subject to application controlling pressures developed by said triple valve, and in thrust relation with the first named abutment; and pressure limiting means for limiting the controlling pressures developed by said triple valve.

29. The combination of a deceleration controlled straight air brake system having a normally vented straight air pipe; an automatic air brake system having a normally charged brake pipe, an auxiliary reservoir and a triple valve associated with said reservoir and brake pipe and arranged to develop an application controlling pressure; and a relay and associated pressure fluid source for developing braking pressure, said relay having a movable actuating abutment subject to the opposing effects of braking pressure and pressure in said straight air pipe, and an auxiliary movable actuating abutment subject to application controlling pressures developed by said triple valve, and in thrust relation with the first named abutment; pressure limiting means for limiting the controlling pressures developed by said triple valve; and means responsive to the individual and combined effects of straight air pipe and brake pipe pressures to render said limiting means alternatively effective and ineffective 30. A fluid pressure brake system, comprising in combination, a normally vented straight air pipe; a normally charged brake pipe; means for controlling pressures in said pipes; a brake cylinder; a source of pressure fluid for applying the brakes; a brake controlling valve device operatively associated with the brake pipe; and a relay valve for admitting pressure fluid from said source to said brake cylinder and for exhausting pressure fluid from said brake cylinder, said relay valve having two actuating abutments, one of which is controlled by operation of the brake controlling valve device, and the other by pressure in the straight air pipe.

31. The combination of a straight air brake system having a normally vented straight air pipe; an automatic air brake system having a normally charged brake pipe and a brake controlling valve device responsive to pressure in said brake pipe to establish application controlling pressures; and a relay, said relay having a movable actuating abutment subject to the opposing effect of braking pressure developed by the relay and pressure in the straight air pipe, and an auxiliary movable actuating abutment subject to application controlling pressures developed by said brake controlling valve device.

32. The combination of a straight air brake system having a normally vented straight air pipe; an automatic air brake system having a normally charged brake pipe and a brake controlling valve device associated therewith and responsive to pressure changes therein to develop an application controlling pressure; a relay, said relay having a movable actuating abutment subject to the opposing effects of braking pressure and pressure in said straight air pipe, and an auxiliary movable actuating abutment subject to application controlling pressures developed by said brake controlling valve device; and a pressure limiting valve for limiting said controlling pressure.

33. The combination of a straight air brake system having a normally vented straight air pipe; an automatic air brake system having a normally charged brake pipe and a brake controlling valve device associated therewith and responsive to pressure changes therein to develop an application controlling pressure; a relay, said relay having a movable actuating abutment subject to the opposing effects of braking pressure and pressure in said straight air pipe, and an auxiliary movable actuating abutment subject to application controlling pressures developed by said brake controlling valve device; a pressure limiting valve for limiting said controlling pressure; and means responsive to brake pipe pressure, and straight air pipe pressure to render said pressure limiting valve alternatively effective or ineffective.

34. The combination of a straight air brake system having a normally vented straight air pipe; an automatic air brake system having a normally charged brake pipe and a brake controlling valve device associated therewith and responsive to pressure changes therein to develop application controlling pressure; a brake cylinder; a relay for controlling brake cylinder pressure; means for causing said relay to respond selectively to said application controlling pressure, and to straight air pipe pressure; a pressure limiting valve for limiting said application controlling pressure; and means responsive to brake pipe pressure and to pressure in said straight air pipe to render said limiting valve alternatively effective or ineffective.

CHARLES A. CAMPBELL.